Aug. 16, 1966          J. C. NEES          3,266,737
NOZZLE HEAD
Filed Feb. 4, 1965
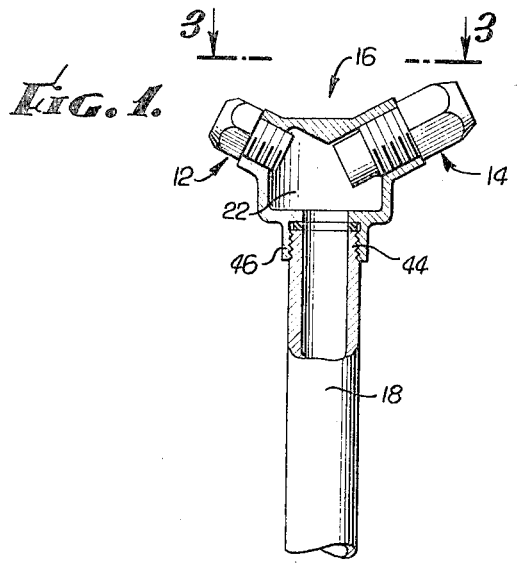
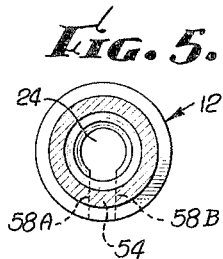
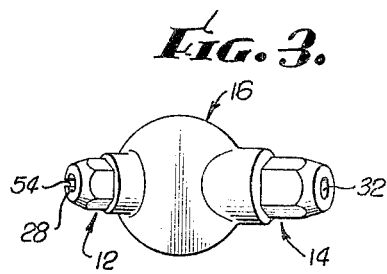
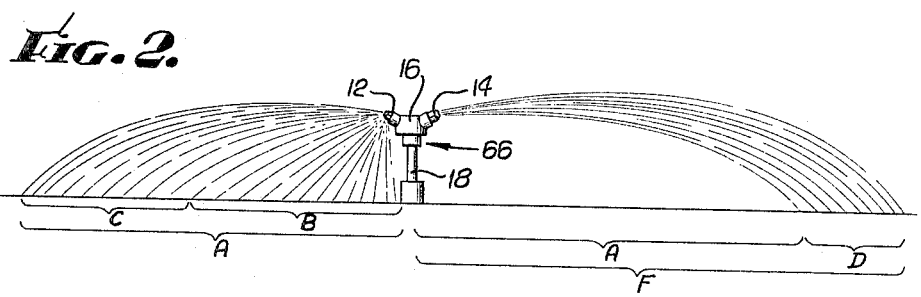
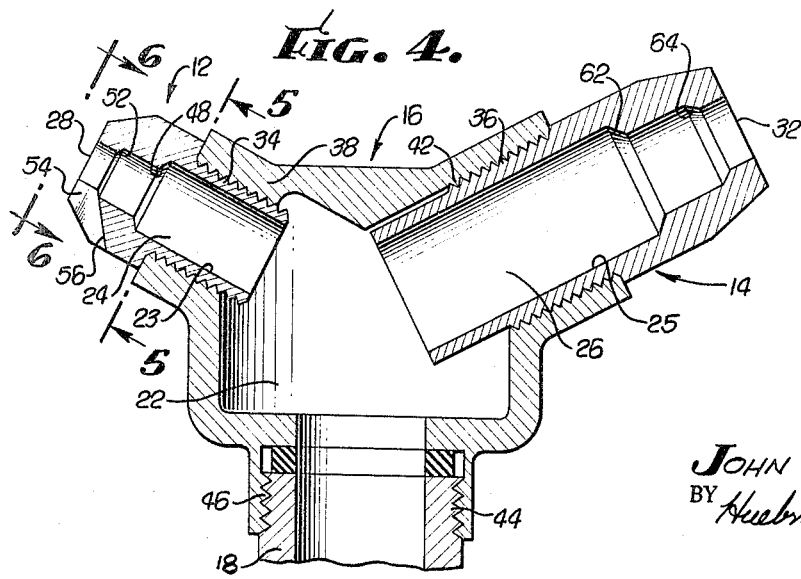
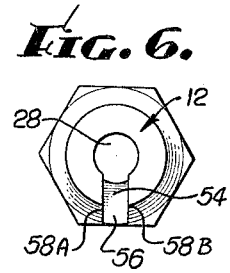
INVENTOR.
JOHN C. NEES
BY Huebner & Worrel
ATTORNEYS.

United States Patent Office 3,266,737
Patented August 16, 1966

1

3,266,737
NOZZLE HEAD
John C. Nees, Arcadia, Calif., assignor to Lawn Tender, Arcadia, Calif., a corporation of California
Filed Feb. 4, 1965, Ser. No. 430,382
5 Claims. (Cl. 239—548)

This invention relates to a nozzle head for a sprinkler unit which is designed to provide an even spray of water from the sprinkler unit. More particularly, nozzles are used in this sprinkler unit which spray substantially the same size droplets of water at different distances from the sprinkler unit.

It has been found that in order to water lawns in the most satisfactory manner a particular size droplet is needed. Such a droplet should be heavy enough to penetrate the outer cover of grass and sink into the soil but not so heavy that it will tend to wash away the top soil. This is particularly important where new grass is being grown. Additionally, when spraying droplets of water there is a critical relationship between the size of the droplets, the air resistance and the velocity at which the droplets are sprayed. If the droplets are too large for the velocity at which they are being sprayed they will tend to erode and wash away the soil which they strike. If they are too small for the velocity at which they are being sprayed they will be turned into a fine mist before they reach the soil.

From this previous discussion it is apparent that there is an ideal size of droplet for watering lawns which will penetrate the soil sufficiently to promote the growth of grass, will not wash away the top soil and can be sprayed a reasonable distance from a sprinkler unit. Experiments have been made to determine this ideal size of water droplet and it has been found that a water droplet approximately three millimeters in diameter is nearly perfect for lawn sprinkling. However, the commercially available lawn sprinklers are not designed to provide a uniform spray of water droplets of this ideal size. Hence, they spray irregular amounts of water on a lawn so that in some places the grass does not get enough water and in other places there is so much water that it tends to wash the top soil away.

Accordingly, it is a primary object of this invention to provide a nozzle system for a lawn sprinkler which will produce an even spray of water comprised of a predetermined size of droplets.

It is further objective of this invention to provide a sprinkler nozzle which is designed so as to produce an even spray of water comprised of droplets which are nearly the ideal size for penetrating the top soil of a lawn.

Another object of this invention is to provide a sprinkler which will spray droplets of water so as to cover substantially completely the area between the sprinkler and the most distant point of the spray from the sprinkler.

Still another object of this invention is to provide a sprinkler having the previously described advantageous objects which has a nozzle that contains a downwardly projecting parallel sided slot.

Other objects and advantages of this invention will become apparent from the following description and drawings wherein:

FIGURE 1 is a side elevational partially sectional view of a double-nozzled sprinkler unit embodying my invention.

FIGURE 2 is a schematic drawing of the spray path that would come from a sprinkler unit such as that shown in FIGURE 1.

FIGURE 3 is a top elevational view of the sprinkler shown in FIGURE 1.

FIGURE 4 is an enlarged sectional view of a preferred embodiment of the nozzle head of the sprinkler unit shown in FIGURE 1.

FIGURE 5 is a cross-sectional view of a nozzle taken through line 5—5 of FIGURE 4.

FIGURE 6 is a cross-sectional view of a nozzle taken through line 6—6 in FIGURE 4.

With reference to the drawings slotted nozzle 12 and nozzle 14 project from a nozzle head 16. An inlet pipe 18 communicates with the interior cavity 22 of nozzle head 16. The cavity 22 also communicates through longitudinal bore 23 defining passageway 24 of slotted nozzle 12 and longitudinal bore 25 defining passageway 26 of nozzle 14. Passageway 24 terminates in an outlet 28 and passageway 26 terminates in an outlet 32. Hence, fluid flowing through inlet pipe 18 will pass into cavity 22 of nozzle head 16 and be sprayed from outlets 28 and 32 of nozzles 12 and 14, respectively.

Though nozzles such as 12 and 14 could be integral with nozzle head 16 they are shown engaged, via threaded shank portions 34 and 36, with internally threaded corresponding sockets 38 and 42 of nozzle head 16. Also threadably engaged is threaded end 44 of pipe 18 in threaded socket 46 of nozzle head 16, though it, too, could be an integral connection.

Nozzle 12 is shown with an annular medial shoulder 48 and a relatively small annular terminal shoulder 52 cut within the internal surface of longitudinal bore 23 defining passageway 24. These shoulders slope toward the outlet 28 and provide steps whereby the diameter of the passageway 24 is decreased toward outlet 28 as compared to the diameter of the passageway remote from outlet 28. The arrangement, size, slope and quantity of such annular shoulders can be varied so as to produce a spray of water droplets from nozzle 12 as desired. In the embodiment shown the internal diameters of the passageways are substantially constant except where the steps are formed by the shoulders.

A slot 54 is cut in nozzle 12 and extends down through the bottom of bore 23 of nozzle 12 when the sprinkler unit to which the nozzle is attached is in operating position. This slot 54 extends to a terminal end 56 which slopes so as to subtend an angle of greater than 90° between it and the axis of bore 23. The significance of this angular sloping of the slot end greater than 90° lies in the fact that slot 54 is intended to provide a spray of water close to the nozzle head over an area which is not covered by the spray that comes from water leaving outlet 28. That is, in order to have any practical spraying effect nozzle 12 will be angled away from the ground which it is spraying. Then, in order to cover fully the intermediate ground between the nozzle 12 and the beginning of the spray area produced by the water coming through outlet 28 the water should spray through the slot in an area that covers the ground from the nozzle 12 out to the beginning of the nozzle spray. In order to do this the nozzle slot 54 needs to have its terminal end 56 sloped at an angle of greater than 90° relative to the axis of bore 23 so that the beginning of this slot spray will be as near to the nozzle as is practical. In practice the nozzle 12 is angled away from the ground so as to provide the desired trajectory to the droplets which are sprayed from the outlet 28 and the terminal end 56 of slot 54 is correspondingly sloped so as to be approximately perpendicular with the ground which is being sprayed when the nozzle 28 is in its designated position on the sprinkler unit.

Another important feature of this slot 56 is that its sides 58A and 58B are parallel to each other. This may be most clearly seen in FIGURE 6. Therefore, since the parallel sides of slot 56 extend from bore 23 defining passageway 24 at its outlet 28 it is no wider than the diameter of bore 23 at outlet 28 and preferably takes a "keyhole" form with passageway 24 such as may be seen in FIGURE 6. The particular dimensions of this passageway and slot are correlated with the water pressure that is to pass through the nozzle so that as close as possible to the ideal drop size for watering lawns is produced. As previously mentioned, this ideal droplet size is three millimeters. For instance, when using the normal water pressure available I have designed a nozzle which produces droplets approaching this ideal size in accordance with this invention which has a 9/32 inch diameter in the largest portion of the bore 23 and terminates in a 5/32 inch diameter outlet at 28. The width of the slot 56 extending from bore 23 is .090±.005 inch. This nozzle is designed to be angled away from the ground so that the axis of passageway 24 forms an angle of about 29° with the ground. Hence, in order for the slot 54 to spray water straight down to the ground adjacent to the nozzle the terminal end 56 of this slot 54 should be sloped at an angle of about 119° relative to the axis of bore 23. It has been found preferable to begin this terminal end 56 of slot 54 approximately in the position of terminal shoulder 56 which I made 1/8 inch from the outlet end 28 of nozzle 12.

The other nozzle 14 shown in the drawing is attached to nozzle head 16 for illustrative purposes only. It merely is intended to show an example of a suitable nozzle which will cover areas beyond that covered by nozzle 12. It could be eliminated or other nozzles which produce the uniform ideal droplet sizes at the desired distances could be substituted for it. This nozzle 14 has annular internal shoulders 62 and 64 which are sloped toward outlet 32. These shoulders 62 and 64 form steps which decrease the diameter of bore 25 defining passageway 26 at outlet 32 relative to its diameter remote from outlet 32.

In operation, as shown in FIGURE 2, a water sprinkler unit 66 having a head 16 with nozzles 12 and 14 will produce a uniform spray coverage of the ground surrounding the sprinkler unit covered by section A. This section A spray is comprised of a section B spray from slot 54 and section C spray from outlet 28 of nozzle 12. A section D spray caused by nozzle 14 begins at the distance from sprinkler 66 that section A spray ends. Since, in this embodiment the nozzle head 16 is intended to be rotated, complete spray coverage surrounding the sprinkler unit in a circular area on the ground having a radius corresponding to section F will be formed. I have found, that by using the nozzle structure previously described, the ideal droplet size of three millimeters can be closely approached. For instance, the average droplet size in section B has been determined to be 1.9 millimeters. In this section it should be noted that there is a spray gap between the terminal end 56 of the slot 54 and the body of the sprinkler unit 66. However, this can be diminished by shortening the length of the nozzle 12 so that any such gap will be covered by miscellaneous dribbling of water from the nozzles. Section C has been found to receive droplets of approximately 2.5 millimeters in size and section D droplets are approximately 3 millimeters in size.

The greatest difficulty has been to produce droplets in the areas closest to the sprinkler unit that are of the desired size. By this invention such difficulty has been substantially overcome and the uniform coverage of ideal size droplets produced. Though the droplets are smallest in the areas closest to the sprinkler this is not a significant problem since they do not need to be sprayed with a force that would tend to cause them to mist. The droplets that are to be sprayed farther from the sprinkler need to more closely approach the ideal size since a greater force will be applied to these droplets.

Though a preferred embodiment of my invention has been illustrated and described herein, no limitation of my invention is intended since it is coextensive with the scope and spirit of the following appended claims.

What I claim as my invention and desire to secure by Letters Patent is:

1. A sprinkler comprising: a base structure including a vertical inlet pipe; a rotatable nozzle head mounted on said pipe so as to be supported above ground for rotation around a vertical axis and capable of expelling water in a continuous pattern from said base structure to a terminal reach, said nozzle head including an interior cavity communicating with said inlet pipe; a relatively short slotted nozzle projecting from said nozzle head at an upward inclination relative to said vertical axis and terminating close to said nozzle head, said slotted nozzle including an internal bore angularly communicating with the interior cavity of said nozzle head, said internal bore extending axially within said slotted nozzle to an unobstructed exterior spray outlet, an annular terminal shoulder within said internal bore forming a step reducing said bore to a constant diameter adjacent said spray outlet; and wherein said slotted nozzle includes a parallel sided slot extending vertically down from said exterior spray outlet through the bottom of said slotted nozzle and terminating in a back wall that is cut adjacent said annular terminal shoulder, and said slot back wall of said internal bore depends generally parallel with said vertical axis, being inclined rearwardly greater than 90° relative to the axis of said slotted nozzle, whereby water sprayed therethrough will be expelled in generally uniform droplets forming said continuous pattern from said base structure to a terminal reach.

2. A sprinkler as defined in claim 1, which includes a second nozzle projecting from said nozzle head and communicating with the interior cavity thereof, which is constructed so as to expel droplets of water beyond the continuous pattern of said slotted nozzle in a second continuous pattern commencing adjacent the terminal reach of the slotted nozzle spray pattern.

3. A sprinkler as defined in claim 2, wherein the internal bore of the slotted nozzle is cylindrical and the space between said parallel sides of side slot is less than the diameter of said reduced internal bore from which it extends, whereby in cross section a keyhole shaped outlet opening is formed.

4. A sprinkler as defined in claim 2, wherein the diameter of the spray outlet in the second nozzle is greater than the diameter of the spray outlet in the slotted nozzle.

5. A sprinkler comprising: a base structure including a vertical inlet pipe; a spray head mounted on top of said base structure and including an internal cavity communicating with said base structure; a short slotted nozzle protruding from the side of said spray head having an internal cylindrical bore communicating with said internal cavity and terminating in a spray outlet, the axis of said internal cylindrical bore is inclined upwardly from the horizontal, said bore including a terminal annular shoulder reducing said bore adjacent said spray outlet, and a parallel sided slot wherein the space between its sides is less than the diameter of said reduced bore, said slot extending through said slotted nozzle from said bore and terminating in a back wall projecting from said annular shoulder on a plane generally parallel with said vertical inlet pipe and subtending an angle of greater than 90° relative to the axis of said slotted nozzle bore whereby water flowing therethrough will be sprayed in a continuous pattern of substantially equal diameter droplets from the base of the sprinkler to the outside periphery of said pattern sprayed by said slotted nozzle; and a second nozzle protruding from said spray head and communicating with said internal cavity therein, said second nozzle having a spray outlet greater in diameter than said slotted nozzle and adapted to spray water therethrough in a pattern beyond that provided by said slotted nozzle, said second nozzle spray pattern commencing adjacent to the outside periphery of the pattern of the slotted nozzle.

References Cited by the Examiner

UNITED STATES PATENTS

| | | | |
|---|---|---|---|
| 1,827,961 | 10/1931 | Thompson | 239—590 |
| 1,976,030 | 10/1934 | Lighthall. | |
| 2,563,962 | 8/1951 | Rieger. | |
| 2,619,388 | 11/1952 | Wahlin. | |
| 2,645,527 | 7/1953 | Walters | 239—590 |
| 2,944,743 | 7/1960 | Kachergis. | |
| 2,964,248 | 12/1960 | O'Brien et al. | 239—601 |
| 2,971,250 | 2/1961 | Wahlin | 239—601 |

FOREIGN PATENTS 546,332  9/1957  Canada.

M. HENSON WOOD, Jr., *Primary Examiner.*

R. S. STROBEL, *Assistant Examiner.*